US007805745B2

(12) United States Patent
Ryden et al.

(10) Patent No.: US 7,805,745 B2
(45) Date of Patent: Sep. 28, 2010

(54) MEDIA CONTENT REBROADCAST

(75) Inventors: Darren Ryden, Reading (GB); Gavin Scurr, London (GB)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 11/812,000

(22) Filed: Jun. 13, 2007

(65) Prior Publication Data

US 2008/0313679 A1 Dec. 18, 2008

(51) Int. Cl.
*H04N 7/173* (2006.01)
(52) U.S. Cl. .............................. 725/94; 725/87; 725/97
(58) Field of Classification Search .................. 725/87, 725/94, 97
See application file for complete search history.

(56) References Cited

U.S. PATENT DOCUMENTS

| | | | |
|---|---|---|---|
| 6,148,005 A | 11/2000 | Paul et al. | |
| 6,269,080 B1* | 7/2001 | Kumar | 370/236 |
| 6,351,467 B1 | 2/2002 | Dillon | |
| 6,385,647 B1 | 5/2002 | Willis et al. | |
| 6,574,795 B1* | 6/2003 | Carr | 725/71 |
| 6,782,490 B2 | 8/2004 | Maxemchuk et al. | |
| 6,782,550 B1* | 8/2004 | Cao | 725/39 |
| 6,842,461 B2 | 1/2005 | Harris | |
| 6,965,593 B2 | 11/2005 | Donahue et al. | |
| 7,177,312 B2 | 2/2007 | Witt et al. | |
| 2003/0206549 A1 | 11/2003 | Mody et al. | |
| 2006/0015928 A1 | 1/2006 | Setty et al. | |
| 2006/0083263 A1 | 4/2006 | Jagadeesan et al. | |
| 2006/0098613 A1 | 5/2006 | Kish et al. | |
| 2007/0061831 A1 | 3/2007 | Savoor et al. | |
| 2007/0101377 A1* | 5/2007 | Six et al. | 725/86 |
| 2008/0086743 A1* | 4/2008 | Cheng et al. | 725/38 |

OTHER PUBLICATIONS

Akester, Richard, "A Resilient Multicast Protocol for Digital TV Over 802.11 Wireless Networks", pp. 1-6.
Li, et al., "Layered Video Multicast with Retransmission (LVIVIR): Evaluation of Error Recovery Schemes", pp. 1-12.
Maxemchuk, et al., "A Cooperative Packet Recovery Protocol for Multicast Video", Date: Oct. 28-31, 1997, pp. 259-256, International Conference on Network Protocols.
Nunome, et al., "A Retransmission-Based Continuous Media Multicast Communication Scheme: The Effect of Buffering Time for Media Synchronization on Application-Level QoS", pp. 1-6.
Paul, et al., "Reliable Multicast Transport Protocol (RMTP)", pp. 1-19.

* cited by examiner

*Primary Examiner*—Hunter B. Lonsberry

(57) ABSTRACT

Media content rebroadcast is described. In embodiment(s), a content distributor broadcasts television media content to client devices, and caches the television media content that is broadcast. A client device can receive the television media content and then request identification data that corresponds to the television media content from the content distributor. The client device can determine whether all of the television media content has been received utilizing the identification data, and request data segment(s) of the television media content that are determined not to have been received. The content distributor receives requests from multiple client devices for data segments of the television media content not received by the client devices. The content distributor can then prioritize the requests based on demand for the data segments that are requested, and queue the data segments prioritized by demand for rebroadcast to the requesting client devices.

16 Claims, 6 Drawing Sheets

MEDIA CONTENT REBROADCAST

BACKGROUND

The variety of television programming and media content sources continues to increase. In addition to scheduled television program broadcasts, television viewing options also include video-on-demand choices which enable a viewer to search for and request media content for viewing when convenient rather than at a scheduled broadcast time. A television system can include television client devices that receive the television programming and other selected media content via a broadcast network and/or an IP-based network (e.g., Ethernet).

One of the challenges with network DVR (digital video recorder) and video download solutions in an IPTV environment is the efficient delivery of requested media content to client devices in time for use by a subscriber. In addition to bandwidth, processor, and other limitations of a media content distribution system, the delivery of requested media content relies on a receiving client device being online and able to subscribe to a multicast from a content distributor to receive the media content. However, a television client device may get turned off either deliberately or during a power outage, or there may be other instances of problems with a media content distribution system or network that prevents a client device from receiving all or part of the requested media content.

SUMMARY

This summary is provided to introduce simplified concepts of media content rebroadcast. The simplified concepts are further described below in the Detailed Description. This summary is not intended to identify essential features of the claimed subject matter, nor is it intended for use in determining the scope of the claimed subject matter.

In embodiment(s) of media content rebroadcast, a content distributor broadcasts television media content to client devices, and caches the television media content that is broadcast. A client device can receive the television media content and then request identification data from the content distributor. The identification data corresponds to the television media content and can include a media content identifier and indexed data segments of the television media content. The client device can determine whether all of the television media content has been received utilizing the identification data, and request data segment(s) of the television media content that are determined not to have been received. The content distributor receives requests from multiple client devices for data segments of the television media content not received by the client devices. The content distributor can then prioritize the requests based on demand for the data segments that are requested, and queue the data segments prioritized by demand for rebroadcast to the requesting client devices.

BRIEF DESCRIPTION OF THE DRAWINGS

Embodiments of media content rebroadcast are described with reference to the following drawings. The same numbers are used throughout the drawings to reference like features and components.

DETAILED DESCRIPTION

Embodiments of media content rebroadcast provide that television client devices can request and receive data segments of previously broadcast television media content that were not received. A content provider can index and/or otherwise identify media content, such as a television program or video on-demand movie, prior to broadcasting the media content to the television client devices. After the client devices receive the media content, identification data that corresponds to the received media content can be requested from the content provider. A client device can then determine whether all of the television media content has been received utilizing the identification data, and request missing data segment(s) of the television media content that are determined not to have been received.

The content distributor can receive requests from the television client devices for the missing data segments of the television media content determined not to have been received at the client devices. The content distributor can then prioritize the requests based on demand for the data segments that are requested, and queue the data segments prioritized by demand for rebroadcast on a second multicast stream to the requesting client devices.

While features and concepts of the described systems and methods of media content rebroadcast can be implemented in any number of different environments, computing systems, television and entertainment systems, and/or other various configurations, embodiments of media content rebroadcast are described in the context of the following example systems and environments.

Figure 1:
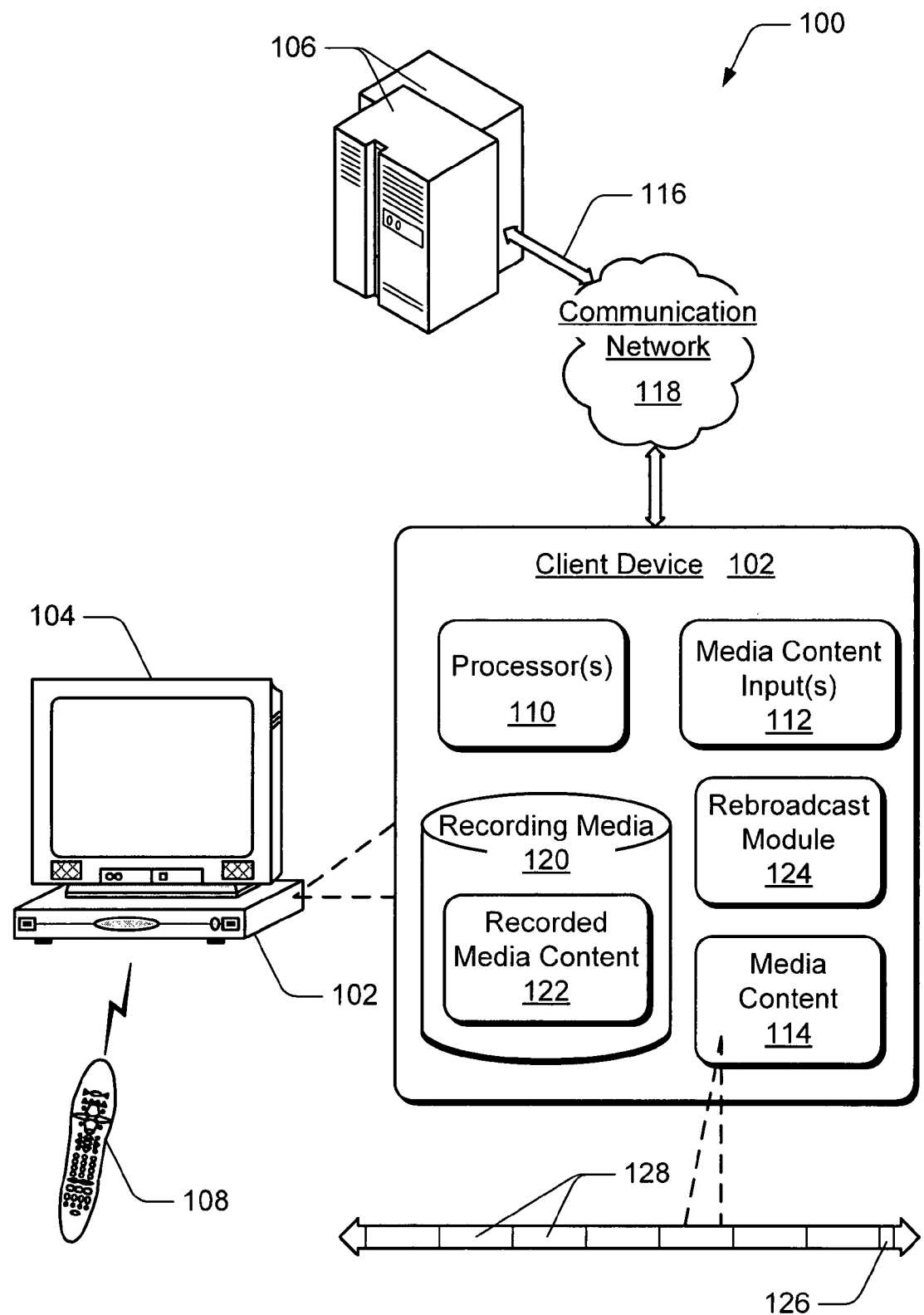
FIG. 1 illustrates an example system in which embodiments of media content rebroadcast can be implemented.

FIG. 1 illustrates an example system 100 in which various embodiments of media content rebroadcast can be implemented. In this example, system 100 includes a television client device 102, a display device 104, content distributor(s) 106, and an input device 108, such as a television remote control. The display device 104 can be implemented as any type of television, LCD, or similar television-based display system that renders audio, video, and/or image data. The client device 102 and display device 104 together are just one example of a television client system, examples of which are described with reference to the example entertainment and information system shown in FIG. 6.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. Additionally, client device 102 can be implemented with any number and combination of differing components as further described with reference to the example computer-based device shown in FIG. 5.

In the example system 100, client device 102 includes one or more processor(s) 110, media content inputs 112, and media content 114 (e.g., received media content or media content that is being received). The media content inputs 112 can include any type of communication interfaces and/or data inputs, such as Internet Protocol (IP) inputs over which streams of television media content (e.g., IPTV media content) are received via an IP-based network 116. A media content input 112 can receive television media content 114 as an IPTV multicast from a content distributor 106. In addition, the media content inputs 112 can include any type of broadcast and/or over-the-air inputs via which off-air media content is received over the air.

The IP-based network 116 can be implemented as part of a communication network 118 that facilitates media content distribution and data communication between the content distributor(s) 106 and any number of client devices, such as client device 102. The communication network 118 can be implemented as part of a media content distribution system using any type of network topology and/or communication protocol, and can be represented or otherwise implemented as a combination of two or more networks. The television client device 102 is configured for communication with the content distributor(s) 106 via the communication network 118 to receive the media content 114.

Client device 102 also includes recording media 120 that maintains recorded media content 122, such as television programs or an on-demand movie recorded for viewing at a later time. For example, a viewer may pre-schedule a download of a video-on-demand movie to be recorded for later viewing. A content distributor 106 can then multicast the pre-scheduled video-on-demand movie to all of the television client devices in a media content distribution system that have requested to receive the particular movie. The recording media 120 along with a playback application can be implemented as a DVR (digital video recorder) system to record and maintain the recorded media content 122.

The media content 114 and/or the recorded media content 122 can include television programs (or programming) which may be any form of programs, commercials, music, movies, and/or video-on-demand media content. Other media content can include interactive games, network-based applications, music streamed from a computing device to the client device 102, as well as any other audio, video, and/or image content received from any type of media content source.

Client device 102 also includes a rebroadcast module 124 that can be implemented as computer-executable instructions and executed by the processor(s) 110 to implement embodiments of media content rebroadcast. In an embodiment, the rebroadcast module 124 can check back with a content distributor 106 after media content has been received to determine whether all of the media content (e.g., a television program, video-on-demand movie, and the like) has been received. The content distributor 106 can identify the range of data segments or data blocks for a particular media content broadcast, and the rebroadcast module 124 can then determine whether all of the media content has been received. The client device 102 can communicate a request to the content distributor 106 for the identification data that corresponds to the received media content via a two-way communication link of the IP-based network 116.

In an embodiment, the identification data that corresponds to media content 114 which has been received can include any type of media content identifier 126 and indexed data segments 128 of the television media content. The identification data that corresponds to the media content 114 can be generated at a content distributor 106 and then communicated to the client device 102 when requested. The identification data can be generated with any type of indexing mechanism that utilizes any form of media content identifiers or indexing protocol to index the video or data blocks of the media content. For example, a television program or movie (e.g., media content) may be segmented by any size of indexed and unique data blocks of the media content.

The rebroadcast module 124 can initiate a request for the identification data that corresponds to the television media content, receive the identification data from a content distributor 106, and then utilize the identification data to determine whether all of the television media content has been received. For example, the television client device 102 can receive media content 114 as a television program or video-on-demand movie that is recorded. The rebroadcast module 124 can then receive the identification data and compare it to the received media content to determine whether all of the media content has been received. For various reasons, all of the media content for a particular broadcast may not be received such as in the event of a power outage, the communication network or media content distribution system being down, bandwidth and/or processing limitations, or for other similar reasons.

If the rebroadcast module 124 determines that all of the media content for a particular broadcast has not been received (e.g., a recorded movie is not complete for viewing), the rebroadcast module 124 can request the missing data segment(s) of the television media content from the content distributor 106. The rebroadcast module 124 can then initiate that the television client device 102 subscribe to a rebroadcast from the content distributor 106 to receive the missing data segment(s). The content distributor 106 can rebroadcast the data segments using a secondary multicast stream.

Figure 2:
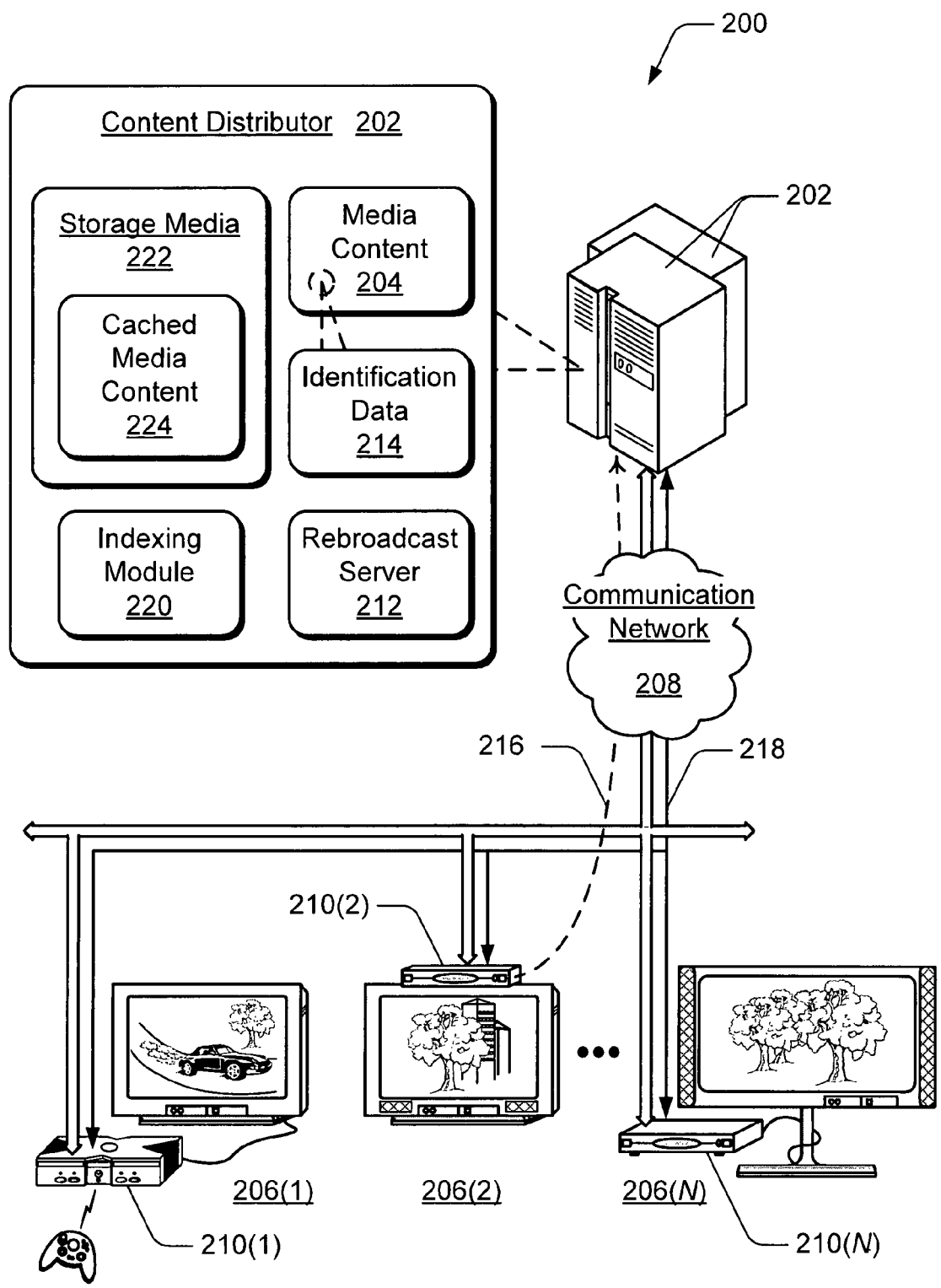
FIG. 2 illustrates another example system in which embodiments of media content rebroadcast can be implemented.

FIG. 2 illustrates another example system 200 in which various embodiments of media content rebroadcast can be implemented. The example system 200 includes content distributor(s) 202 that communicate media content 204 to any number "N" of various television client systems 206(1-N) via a communication network 208. An example of a communication network is described with reference to communication network 118 shown in FIG. 1. Examples of client devices in television client systems are described with reference to television client device 102 as also shown in FIG. 1. The communication network 208 can be implemented to include an IP-based network and/or a broadcast network that both facilitate media content distribution and data communication between the content distributor(s) 202 and any number of television client devices.

Each of the television client systems 206(1-N) include a respective television client device 210(1-N) and a display device, such as any type of television, monitor, LCD, or similar television-based display system that renders audio, video, and/or image data. Any of the client devices 210(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. Any of the television client devices 210(1-N) may also be associated with a user (i.e., a person) and/or an entity that operates a client device such that a television client device describes logical clients that include users, software, and/or devices.

Any of the television client devices 210(1-N) of the respective client systems 206(1-N) can be implemented with one or more processors, a communication module, memory components, and a media content rendering system. Any of the client devices 210(1-N) can also include a rebroadcast module, such as rebroadcast module 124 described with reference to FIG.

1. Additionally, each of the television client devices 210(1-N) can be configured for communication with any number of different content distributors 202 to receive any type of media content 204 via the communication network 208. Further, any of the television client devices 210(1-N) can be implemented with any number and combination of differing components as further described with reference to the example computer-based device shown in FIG. 5.

In this example, a content distributor 202 includes a rebroadcast server 212 to implement embodiments of media content rebroadcast. In an embodiment, the content distributor 202 can broadcast the media content 204 to the television client devices 210(1-N) as an IPTV multicast via the communication network 208. Any one or more of the client devices 210(1-N) can then request identification data 214 from the content distributor 202 after receiving the media content 204. For example, the content distributor can broadcast a television program or a movie to the client devices 210(1-N), and then receive request(s) 216 from the client devices for the identification data 214 that corresponds to the broadcast media content.

The content distributor 202 can receive the request(s) 216 for the identification data 214 from the client devices 210(1-N) via a two-way data communication link 218 of the communication network 208. It is contemplated that any one or more of the arrowed communication links 218 along with communication network 208 facilitate two-way data communication, such as from a television client system 206(2) to a content distributor 202 and vice-versa.

The content distributor 202 can then communicate the identification data 214 to the requesting television client devices 210(1-N) that each utilize the identification data 214 to determine whether all of the data segments of the broadcast media content have been received. The identification data 214 can include a media content identifier (e.g., an identifier of the television program or movie), and can include indexed data segments of the media content. In this example, the content distributor 202 includes an indexing module 220 that can be implemented to index data segments of the media content 204 prior to the media content being broadcast to the client devices 210(1-N). The content distributor 202 also includes storage media 222 to store cached media content 224. In an embodiment, the content distributor 202 can cache the media content 204 that is broadcast to the client devices 210(1-N).

The content distributor 202 can also receive requests from any of the television client devices 210(1-N) for missing data segments of the television media content determined not to have been received. For example, a rebroadcast module of client device 210(2) may determine that not all of a television program or movie has been received, and can then initiate a request to the content distributor 202 for the missing data segment(s).

The rebroadcast server 212 can prioritize the requests for missing data segments received from various television client devices 210(1-N) based on demand for particular ones of the data segments. The frequency of particular requested data segments can be prioritized for rebroadcast. For example, a data segment of media content that has been requested by multiple television client devices can be given a higher priority for rebroadcast than a data segment of media content that has only been requested by a single television client device. The rebroadcast server 212 can then queue the requested, missing data segments of the television media content from the cached media content 224 and prioritize the data segments for rebroadcast to the client devices.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example methods 300 and 400 described with reference to respective FIGS. 3 and 4 may be described in the general context of computer-executable instructions. Generally, computer-executable instructions can include applications, routines, programs, objects, components, data structures, procedures, modules, functions, and the like that perform particular functions or implement particular abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
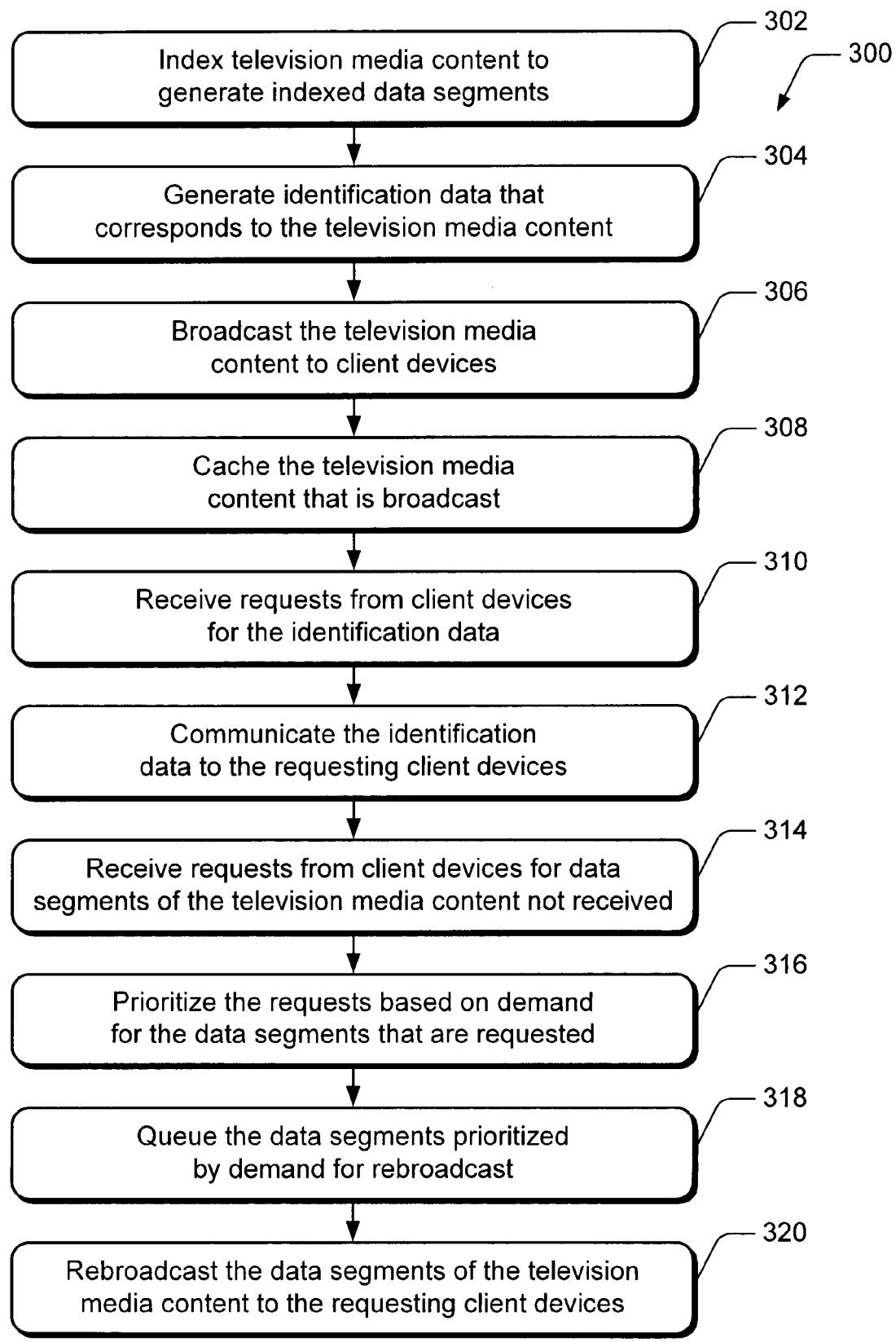
FIG. 3 illustrates example method(s) of media content rebroadcast in accordance with one or more embodiments.

FIG. 3 illustrates example method(s) 300 of media content rebroadcast, and is described with reference to content distributor 202 shown in FIG. 2. The order in which the method is described is not intended to be construed as a limitation, and any number of the described method blocks can be combined in any order to implement the method, or an alternate method.

At block 302, television media content is indexed to generate indexed data segments of the television media content. For example, the indexing module 220 of content distributor 202 indexes data segments of the media content 204 prior to the media content being broadcast to the television client devices 210(1-N) so that the client devices will be able to determine whether all of the broadcast media content has been received.

At block 304, identification data that corresponds to the television media content is generated. For example, the rebroadcast server 212 and/or the indexing module 220 of content distributor 202 generates identification data 214 which can include a media content identifier of particular broadcast media content (e.g., a television program, video-on-demand movie, or other media content), and can include indexed data segments of the television media content.

At block 306, the television media content is broadcast to client devices. For example, content distributor 202 broadcasts the media content 204 as an IPTV multicast to the television client devices 210(1-N) via the communication network 208. At block 308, the television media content that is broadcast to the client devices is cached. For example, the media content 204 that is broadcast to the television client devices 210(1-N) is cached by the storage media 222 and is maintained as the cached media content 224.

At block 310, requests are received from client devices for the identification data that corresponds to the television media content. For example, the content distributor 202 receives requests for the identification data 214 from any one or more of the television client devices 210(1-N) after the client devices receive the media content 204 (e.g., the media content 204 that is broadcast at block 306).

At block 312, the identification data is communicated to the requesting client device(s). For example, content distributor 202 communicates the identification data 214 to any one or more of the television client devices 210(1-N) that each utilize the identification data to determine whether all of the data segment(s) of the broadcast television media content have been received. At block 314, requests are received from the client devices for the data segments of the television media content that have not been received (at the client devices). For example, content distributor 202 receives requests from any of the television client devices 210(1-N) for missing data segments of the television media content determined not to have been received.

At block 316, the requests are prioritized based on demand for the data segments that are requested. For example, the rebroadcast server 212 of content distributor 202 prioritizes the requests for missing data segments received from the various television client devices 210(1-N) based on demand for particular ones of the data segments. At block 318, the data segments are queued and prioritized based on the demand for rebroadcast to the client devices. For example, the rebroadcast server 212 queues the requested, missing data segments of the television media content 204 from the cached media content 224 and prioritizes the data segments for rebroadcast to the requesting client devices 210(1-N).

At block 320, the data segments of the television media content are rebroadcast to the client devices that subscribe to the rebroadcast of the data segments. For example, the rebroadcast server 212 schedules a rebroadcast of the queued, missing data segments and then rebroadcasts the data segments to the requesting television client devices 210(1-N) that subscribe to the rebroadcast. The content distributor 202 can rebroadcast the data segments using a secondary multicast stream.

Figure 4:
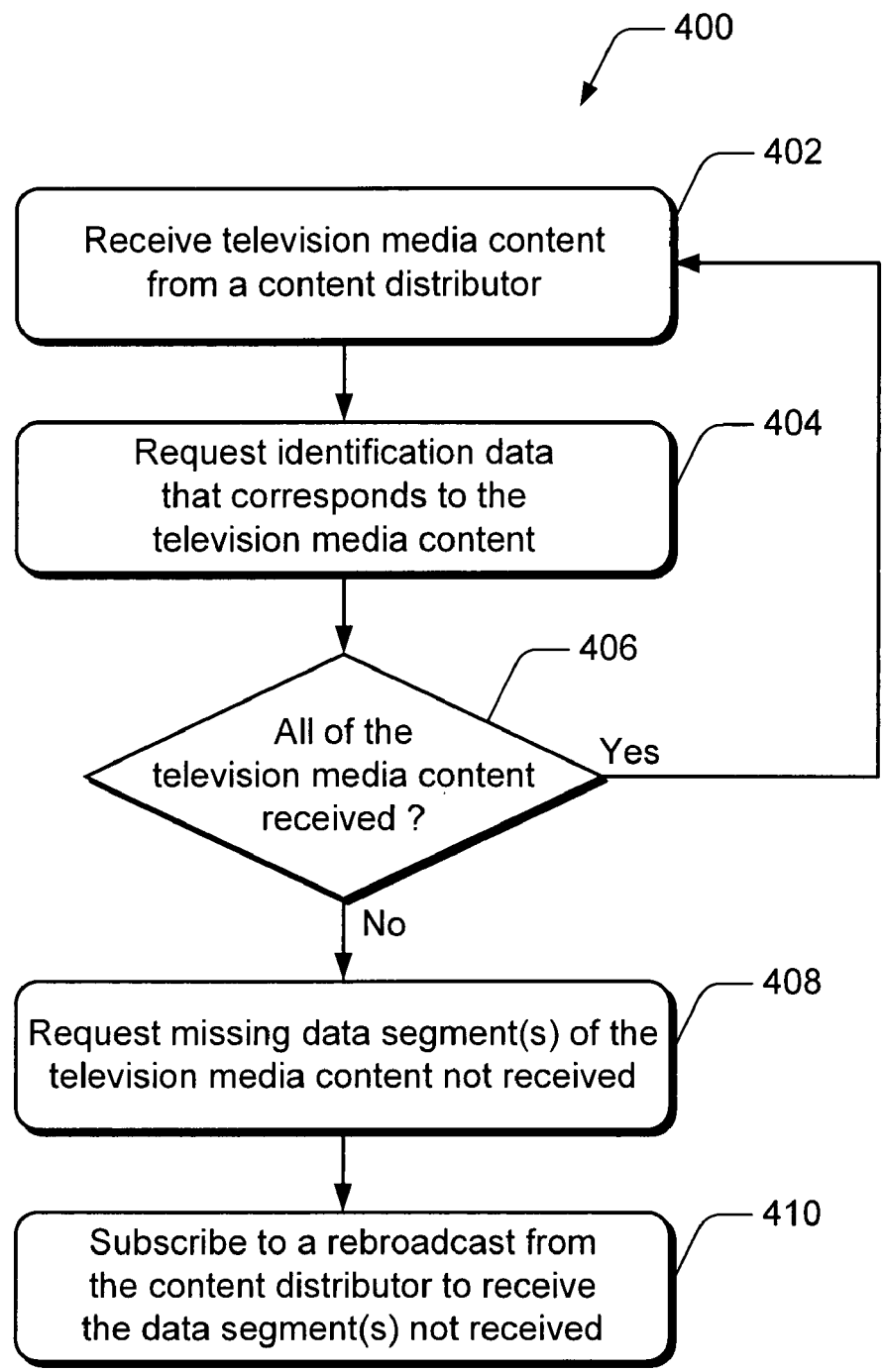
FIG. 4 illustrates example method(s) of media content rebroadcast in accordance with one or more embodiments.

FIG. 4 illustrates example method(s) 400 of media content rebroadcast, and is described with reference to television client device 102 shown in FIG. 1. The order in which the method is described is not intended to be construed as a limitation, and any number of the described method blocks can be combined in any order to implement the method, or an alternate method.

At block 402, television media content is received from a content distributor. For example, television client device 102 receives television media content 114 as an IPTV multicast from a content distributor 106 via the communication network 118 and a media content input 112. At block 404, identification data that corresponds to the television media content is requested. For example, client device 102 communicates a request to the content distributor 106 for identification data that corresponds to the received media content 114 after the media content is received. The identification data that corresponds to the television media content can include a media content identifier 126 and indexed data segments 128 of the television media content.

At block 406, a determination is made as to whether all of the television media content has been received. For example, the rebroadcast module 124 of client device 102 utilizes the identification data that corresponds to the television media content to determine whether all of a media content has been received, such as all of a television program or a video-on-demand movie. If all of the television media content has been received (i.e., "Yes" from block 406), then the method continues at block 402 to receive additional television media content.

If not all of the television media content has been received (i.e., "No" from block 406), then the missing data segment(s) of the television media content determined not to have been received are requested at block 408. For example, the rebroadcast module 124 can initiate a request for missing data segment(s) of the television media content from the content distributor 106. At block 410, a rebroadcast from the content distributor is subscribed to receive the missing data segments determined not to have been received. For example, the rebroadcast module 124 initiates that the television client device 102 subscribe to a rebroadcast from the content distributor 106 to receive the missing data segment(s).

Figure 5:
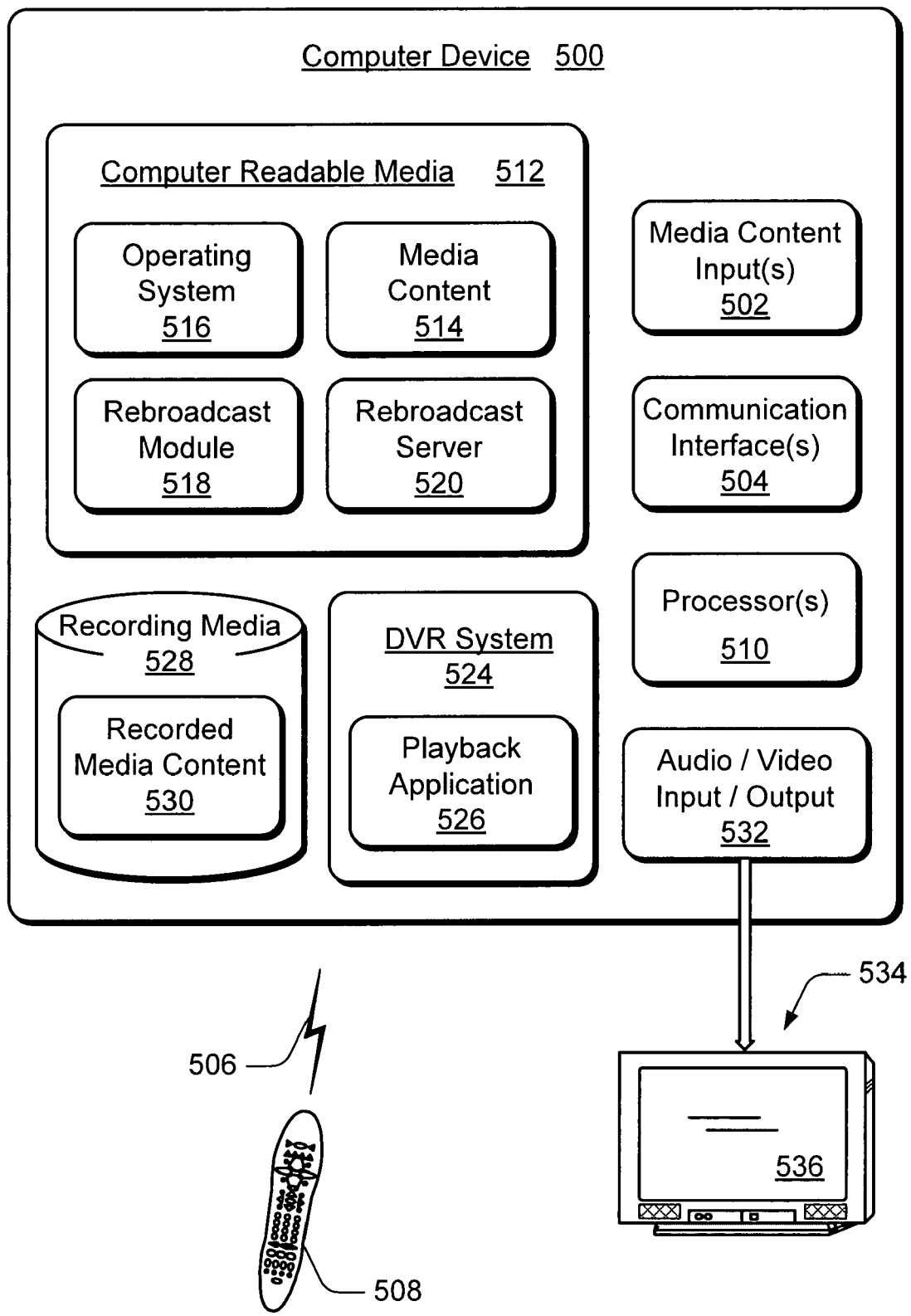
FIG. 5 illustrates various components of an example computer device which can implement embodiments of media content rebroadcast.

FIG. 5 illustrates various components of an example computer-based device 500 that can be implemented as any form of a computing, electronic, appliance, or television client device to implement embodiments of media content rebroadcast. For example, computer device 500 can be implemented as television client device 102 shown in FIG. 1, or as the content distributor 202 or any of the television client devices 210(1-N) shown in FIG. 2. In various embodiments, computer device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Computer device 500 includes one or more media content inputs 502 that may include Internet Protocol (IP) inputs over which streams of media content are received via an IP-based network. Computer device 500 further includes communication interface(s) 504 that can be implemented as any one or more of a serial and/or parallel interface, a wireless interface, any type of network interface, a modem, and as any other type of communication interface. A network interface provides a connection between computer device 500 and a communication network by which other electronic and computing devices can communicate data with device 500.

Similarly, a serial and/or parallel interface provides for data communication directly between computer device 500 and the other electronic or computing devices. A modem also facilitates communication with other electronic and computing devices via a conventional telephone line, a DSL connection, cable, and/or other type of connection. A wireless interface enables computer device 500 to receive control input commands 506 and other information from an input device, such as from remote control device 508, a portable computing-based device (such as a cellular phone), or from another infrared (IR), 802.11, Bluetooth, or similar RF input device.

Computer device 500 also includes one or more processor(s) 510 (e.g., any of microprocessors, controllers, and the like) which process various computer-executable instructions to control the operation of device 500, to communicate with other electronic and computing devices, and to implement embodiments of media content rebroadcast. Computer device 500 can be implemented with computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 512 provides data storage mechanisms to store media content 514 as well as other information and/or data such as software applications and any other types of information and data related to operational aspects of computer device 500. For example, an operating system 516 and/or other computer applications can be maintained as software applications with the computer-readable media 512 and executed on processor(s) 510 to implement embodiments of media content rebroadcast.

The computer applications can include a rebroadcast module 518 when computer device 500 is implemented as television client device, and/or can include a rebroadcast server 520 and indexing module (not shown) when implemented as a content distributor. The rebroadcast module 518 and the rebroadcast server 520 are shown as software modules in this example to implement various embodiments of media content rebroadcast as described herein. An example of the rebroadcast module 518 is described with reference to rebroadcast module 124 in client device 102 as shown in FIG. 1, and an example of the rebroadcast server 520 is described with reference to rebroadcast server 212 in content distributor 202 as shown in FIG. 2.

When implemented as a television client device, the computer device 500 can also include a DVR system 524 with playback application 526, and recording media 528 to maintain recorded media content 530 that computer device 500 receives and/or records. Further, computer device 500 may access or receive additional recorded media content that is maintained with a remote data store (not shown). Computer device 500 may also receive media content from a video-on-demand server, or media content that is maintained at a broadcast center or content distributor that distributes the media content to subscriber sites and client devices. The playback application 526 can be implemented as a video control application to control the playback of media content 514, the recorded media content 530, and/or other video on-demand media content, music, and any other audio, video, and/or image media content which can be rendered and/or displayed for viewing.

Computer device 500 also includes an audio and/or video output 532 that provides audio and/or video data to an audio rendering and/or display system 534. The audio rendering and/or display system 534 can include any devices that process, display, and/or otherwise render audio, video, and image data. Video signals and audio signals can be communicated from computer device 500 to a display device 536 via an RF (radio frequency) link, S-video link, composite video link, component video link, DVI (digital video interface), analog audio connection, or other similar communication link. Alternatively, the audio rendering and/or display system 534 can be implemented as integrated components of the example computer device 500.

Figure 6:
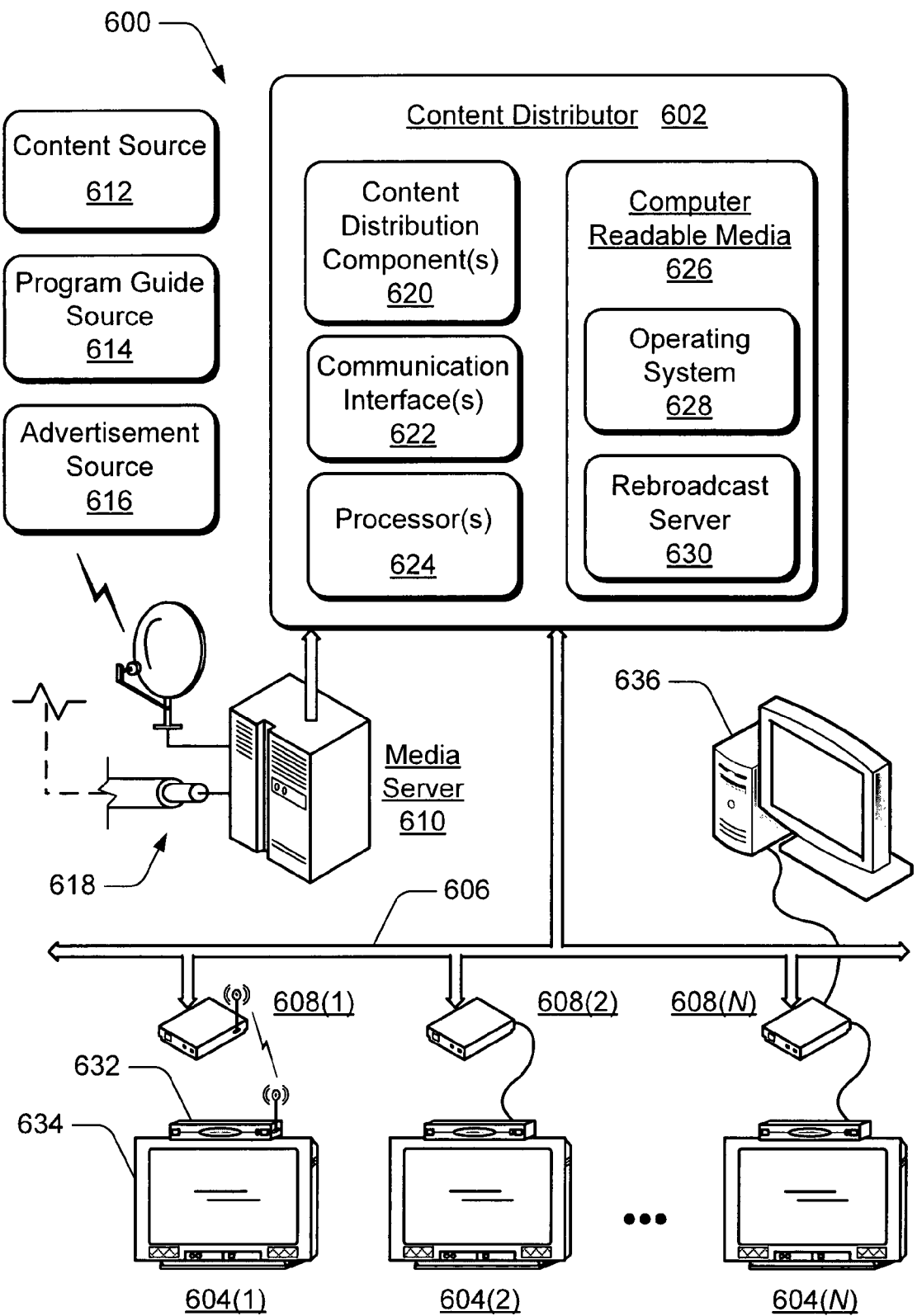
FIG. 6 illustrates various devices and components in an example entertainment and information system in which embodiments of media content rebroadcast can be implemented.

FIG. 6 illustrates an example entertainment and information system 600 in which embodiments of media content rebroadcast can be implemented. System 600 facilitates the distribution of media content, program guide data, and advertising content to multiple viewers and to multiple viewing systems. System 600 includes a content distributor 602 and any number "N" of client systems 604(1-N) each configured for communication via a communication network 606. Each client system 604(1-N) is an example of the client systems 206(1-N) described with reference to FIG. 2. Each of the client systems 604(1-N) can receive data streams of media content, program content, program guide data, advertising content, closed captions data, and the like from content server(s) of the content distributor 602 via the communication network 606.

The communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and the client systems 604(1-N).

System 600 includes a media server 610 that receives media content from a content source 612, program guide data from a program guide source 614, and advertising content from an advertisement source 616. In an embodiment, the media server 610 represents an acquisition server that receives the audio and video media content from content source 612, an EPG server that receives the program guide data from program guide source 614, and/or an advertising management server that receives the advertising content from the advertisement source 616.

The content source 612, the program guide source 614, and the advertisement source 616 control distribution of the media content, the program guide data, and the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, and advertising content to multiple subscribers (e.g., the client systems 604(1-N)). The content distributor 602 can be implemented as a satellite operator, a network television operator, a cable operator, and the like to control distribution of media content, program and advertising content, such as movies, television programs, commercials, music, and other audio, video, and/or image content to the client systems 604(1-N).

Content distributor 602 includes various content distribution components 620 to facilitate media content processing and distribution, such as a subscriber manager, a device monitor, and one or more content servers. The the client manager manages subscriber data, and the device monitor monitors the client systems 604(1-N) (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of media content rebroadcast.

The content distributor 602 includes communication interface(s) 622 that can be implemented as any type of interface to communicate and receive off-air program guide data from client devices of the television system. The content distributor 602 also includes one or more processor(s) 624 (e.g., any of microprocessors, controllers, and the like) which process various computer-executable instructions to control the operation of content distributor 602. The content distributor 602 can be implemented with computer-readable media 626 which provides data storage to maintain software applications such as an operating system 628 and a rebroadcast server 630. The rebroadcast server 630 can implement one or more embodiments of media content rebroadcast as described with reference to rebroadcast server 212 in content distributor 202 shown in FIG. 2.

The client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. Additionally, any of the client devices 632 of a client system 604 can implement features and embodiments of media content rebroadcast as described herein.

Although embodiments of media content rebroadcast have been described in language specific to features and/or methods, it is to be understood that the subject of the appended claims is not necessarily limited to the specific features or methods described. Rather, the specific features and methods are disclosed as example implementations of media content rebroadcast.

The invention claimed is:

1. A method, comprising:
broadcasting television media content to client devices;
caching the television media content that is broadcast to the client devices;
receiving a request from a client device for a missing data segment of the television media content when the client device determines the missing data segment has not been received;
prioritizing the request from the client device based on demand for the missing data segment;
queuing the missing data segment of the television media content requested by the client device, the queuing being prioritized by the demand for the missing data segment; and
rebroadcasting the missing data segment of the television media content to the client device.

2. A method as recited in claim 1, further comprising:
receiving an additional request from the client device for identification data that corresponds to the television media content; and
communicating the identification data to the client device that utilizes the identification data to determine that the missing data segment of the television media content has not been received.

3. A method as recited in claim 1, further comprising generating identification data that corresponds to the television media content, the identification data including a media content identifier and indexed data segments of the television media content.

4. A method as recited in claim 3, further comprising indexing the television media content to generate the indexed data segments of the television media content.

5. A method as recited in claim 1, further comprising rebroadcasting the missing data segments of the television media content to the client devices that subscribe to the rebroadcast of the missing data segments.

6. A method as recited in claim 1, wherein the television media content is broadcast to the client devices as an IPTV multicast, and wherein the missing data segment of the television media content is rebroadcast to the client device via a secondary multicast stream.

7. A content distributor, comprising:
a media content distribution system configured to broadcast television media content to client devices;
a rebroadcast server configured to:
receive a request from a client device for a missing data segment of the television media content when the client device determines the missing data segment has not been received;
prioritize the request based upon demand for the missing data segment;
queue the missing data segment of the television media content requested by the client device, the queue of the missing data segment prioritized by the demand; and
rebroadcast the missing data segment of the television media content to the client device.

8. A content distributor as recited in claim 7, further comprising storage media configured to cache the television media content that is broadcast to the client devices, and the rebroadcast server further configured to queue the missing data segment of the television media content from the cache of the broadcast television media content.

9. A content distributor as recited in claim 7, wherein the rebroadcast server is further configured to:
receive an additional request from the client device for identification data that corresponds to the television media content; and
communicate the identification data to the client device that utilizes the identification data to determine that the missing data segment of the television media content has not been received.

10. A content distributor as recited in claim 9, wherein the identification data includes a media content identifier and indexed data segments of the television media content.

11. A content distributor as recited in claim 10, further comprising an indexing module configured to index the data segments of the television media content prior to the television media content being broadcast to the client devices.

12. A content distributor as recited in claim 7, wherein the rebroadcast server is further configured to rebroadcast the missing data segments of the television media content to the client devices that subscribe to the rebroadcast of the missing data segments.

13. A content distributor as recited in claim 7, wherein the media content distribution system is further configured to broadcast the television media content to the client devices as an IPTV multicast, and wherein the rebroadcast server is further configured to rebroadcast the missing data segment of the television media content to the client device via a secondary multicast stream.

14. A television client device, comprising:
a media content input configured to receive television media content as an IPTV multicast from a content distributor;
a rebroadcast module configured to:
initiate a request for identification data that corresponds to the television media content, the request for the identification data being communicated to the content distributor after the television media content is received;
determine whether all of the television media content has been received utilizing the identification data that corresponds to the television media content;
request a missing data segment of the television media content when the missing data segment is determined not to have been received, the request for the missing data segment being communicated to the content distributor that is configured to prioritize the request for the missing data segment based upon demand for the missing data segment and queue the missing data segment prioritized by the demand; and wherein the media content input is further configured to receive the missing data segment as a rebroadcast via a secondary multicast stream when the content distributor rebroadcasts the missing data segment of the television media content.

15. A television client device as recited in claim 14, wherein the rebroadcast module is further configured to subscribe to the rebroadcast from the content distributor to receive the missing data segment of the television media content when the missing data segment has been determined not to have been received.

16. A television client device as recited in claim 14, wherein the identification data that corresponds to the television media content includes a media content identifier and indexed data segments of the television media content.

* * * * *